Figure 1:
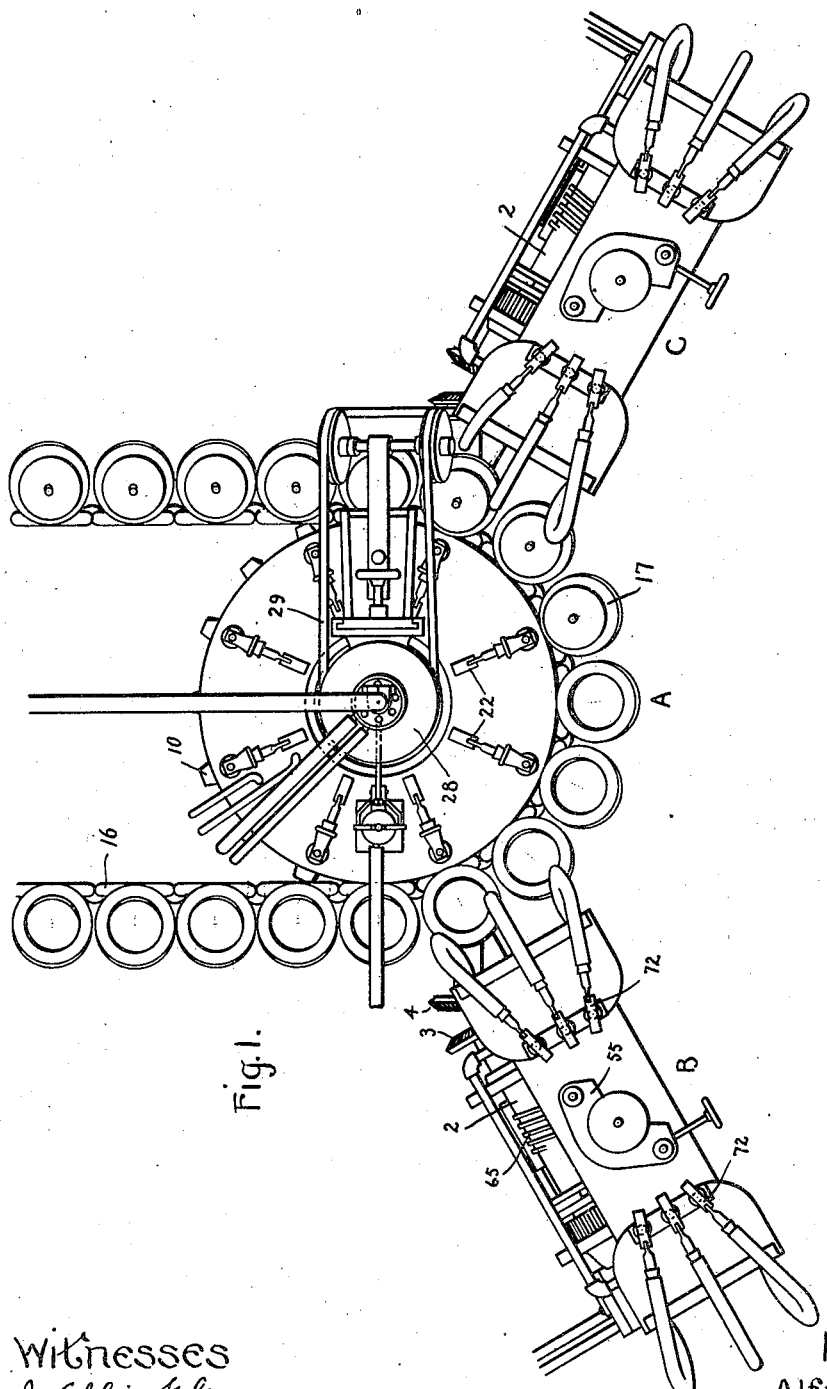

No. 877,013. PATENTED JAN. 21, 1908.
A. SWAN.
MACHINE FOR MAKING INCANDESCENT LAMPS.
APPLICATION FILED MAY 25, 1906.

6 SHEETS—SHEET 1.

Witnesses
J. Ellis Elen
Helen Alford

Inventor
Alfred Swan
by Albert G. Davis
Atty.

No. 877,013. PATENTED JAN. 21, 1908.
A. SWAN.
MACHINE FOR MAKING INCANDESCENT LAMPS.
APPLICATION FILED MAY 25, 1906.

6 SHEETS—SHEET 2.

Witnesses
J. Ellis Glen
Helen Alfred

Inventor
Alfred Swan
by Albert G. Davis
Atty.

No. 877,013.  PATENTED JAN. 21, 1908.
A. SWAN.
MACHINE FOR MAKING INCANDESCENT LAMPS.
APPLICATION FILED MAY 25, 1906.
6 SHEETS—SHEET 3.
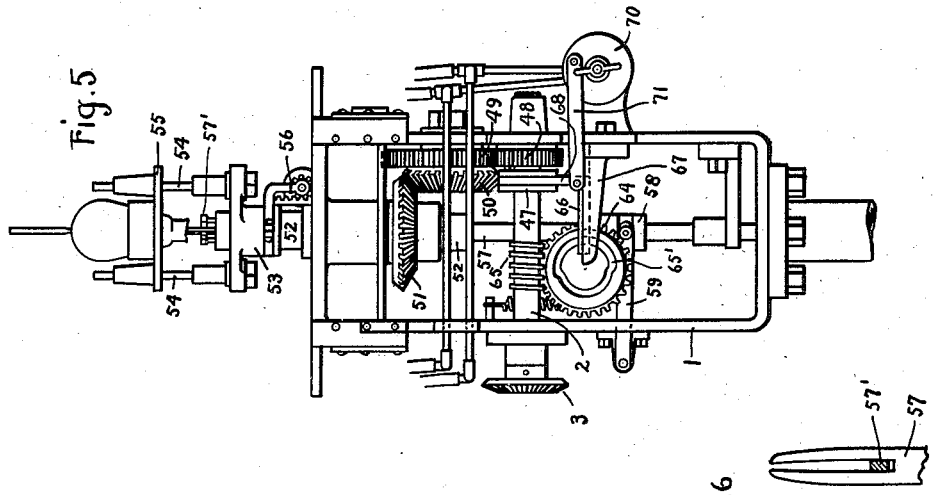
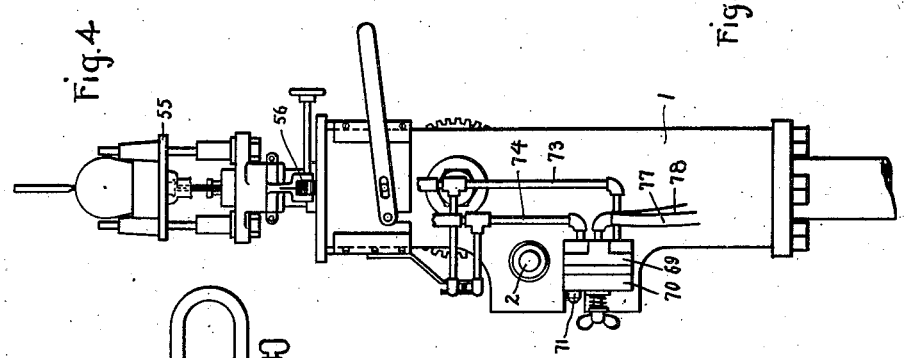
Inventor
Alfred Swan

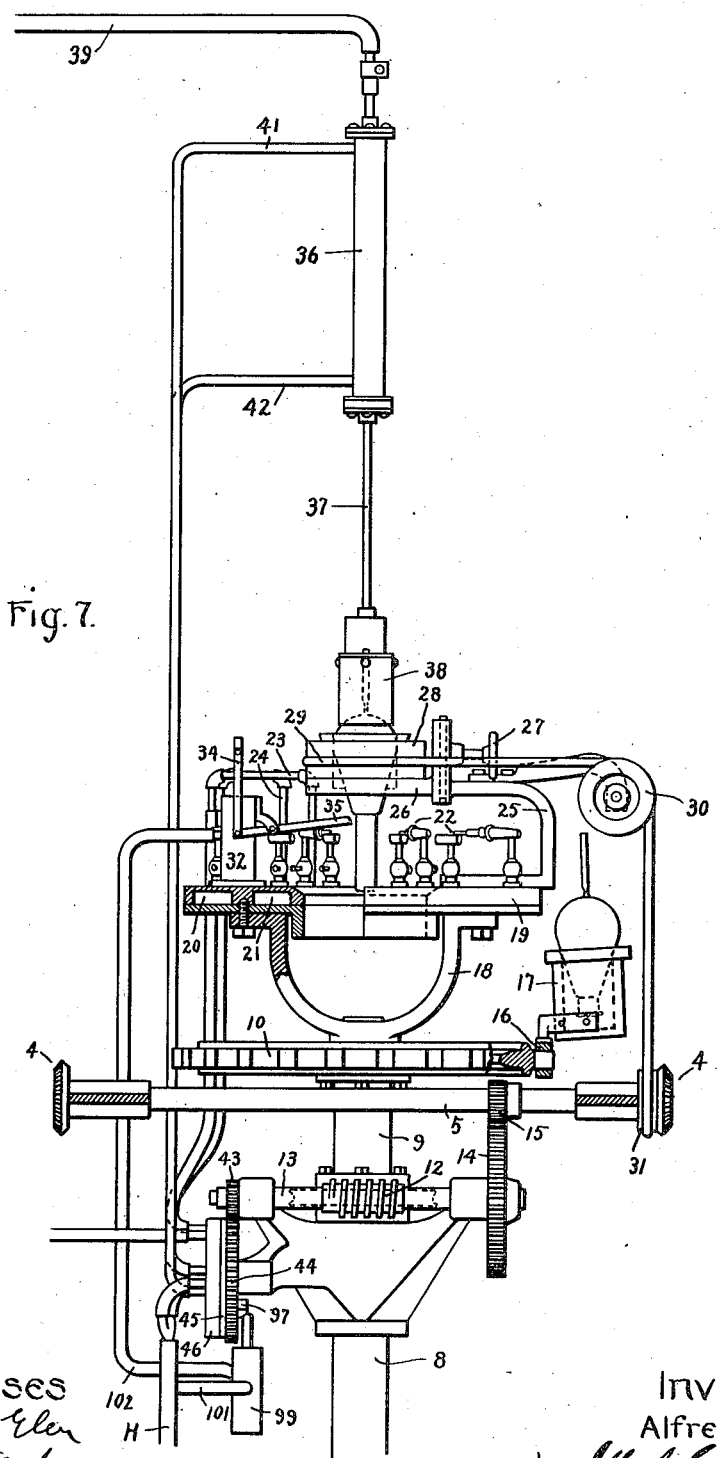

No. 877,013. PATENTED JAN. 21, 1908.
A. SWAN.
MACHINE FOR MAKING INCANDESCENT LAMPS.
APPLICATION FILED MAY 25, 1906.
6 SHEETS—SHEET 5.
Fig. 8.
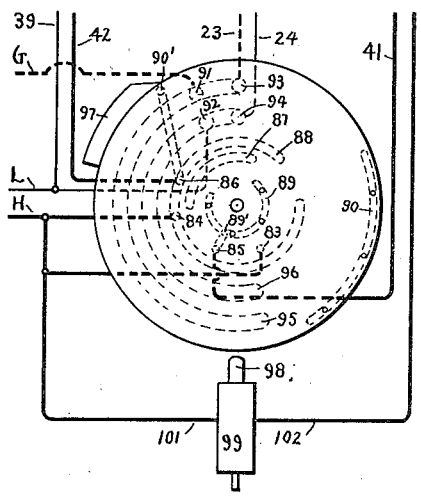
Fig. 9.
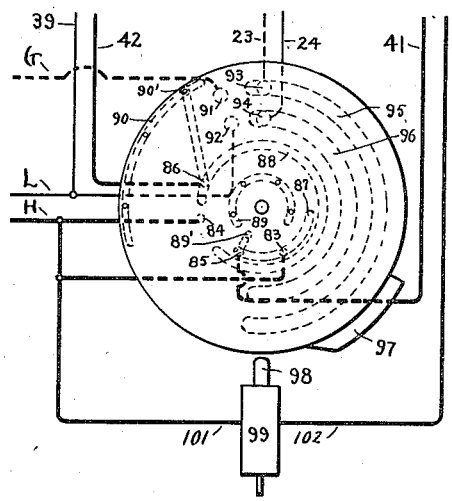
Fig. 10. Fig. 11.
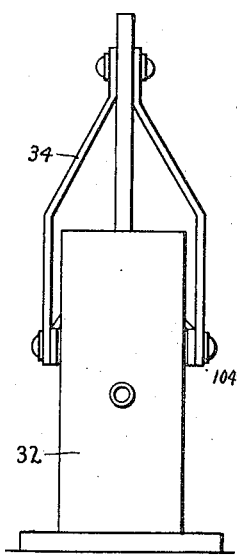
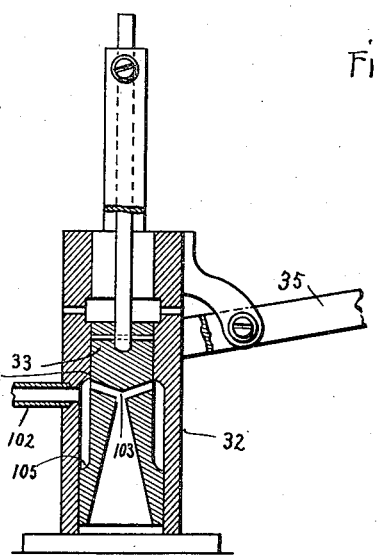
Fig. 12.
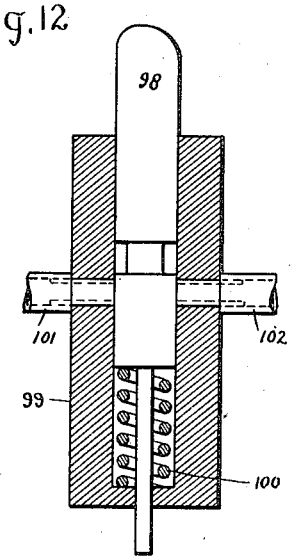
Witnesses.
J. Ellis Glen
Helen Alford
Inventor:
Alfred Swan
by Albert G. Davis
Atty.

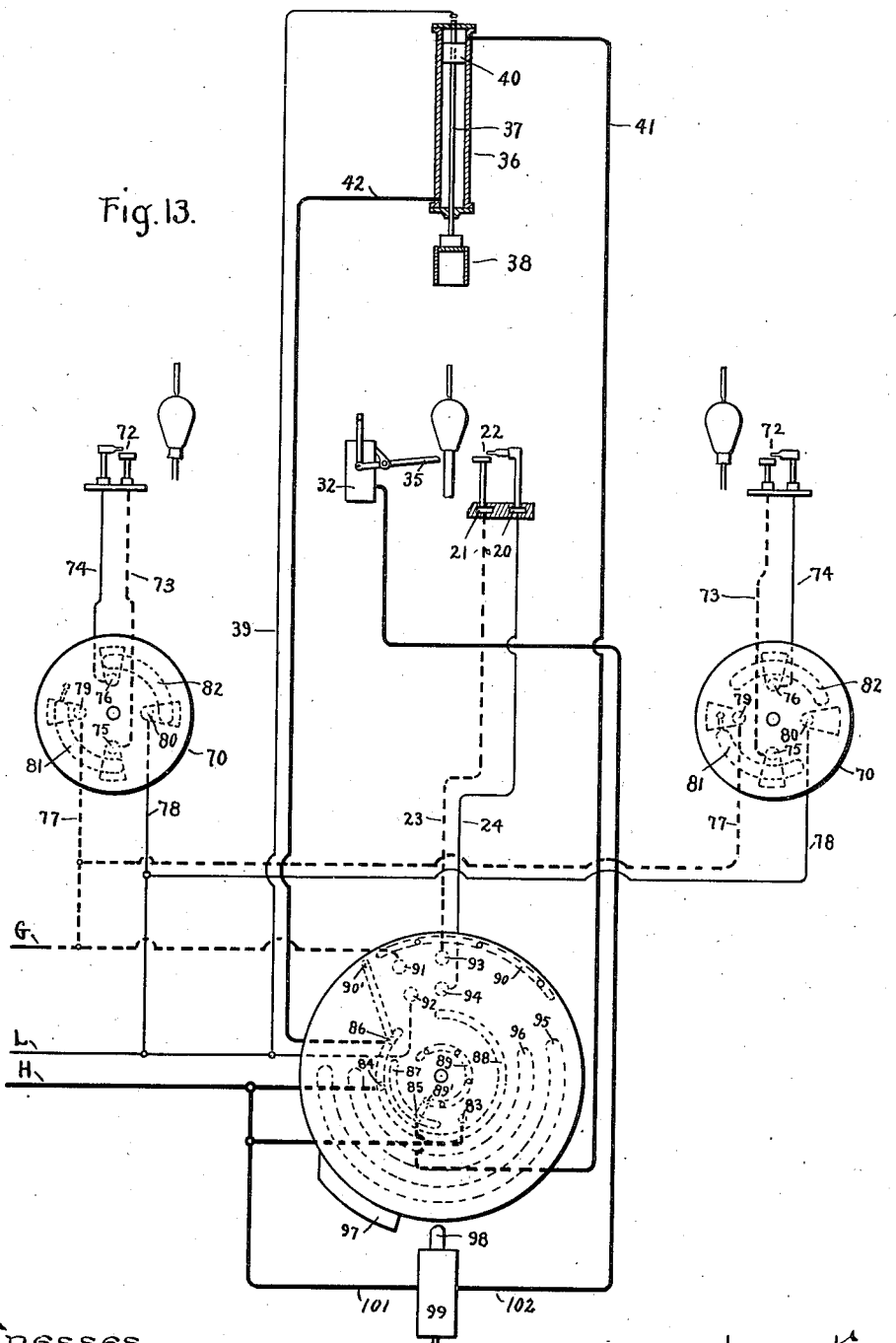

UNITED STATES PATENT OFFICE.

ALFRED SWAN, OF NEW YORK, N. Y., ASSIGNOR TO GENERAL ELECTRIC COMPANY, A CORPORATION OF NEW YORK.

MACHINE FOR MAKING INCANDESCENT LAMPS.

No. 877,013.   Specification of Letters Patent.   Patented Jan. 21, 1908.

Application filed May 25, 1906. Serial No. 318,686.

*To all whom it may concern:*

Be it known that I, ALFRED SWAN, a subject of the King of Great Britain, residing at New York, county of New York, State of New York, have invented certain new and useful Improvements in Machines for Making Incandescent Lamps, of which the following is a specification.

This invention relates to machines for use in the manufacture of incandescent lamps and more particularly to machines for performing the operations of blowing-off and sealing-in.

The bulbs for incandescent lamps, as delivered by the glass-blowers, have necks consisting of long glass tubes. The bulbs are punctured at the ends opposite the necks and short glass tubes called tubulatures, through which the air may be exhausted from the bulbs, are joined to the bulbs communicating with these openings. The long necks of the bulbs are then severed in the operation known as blowing-off, leaving very short necks having thin walls to which the stems carrying the filaments are afterward joined in the operation of sealing-in. My invention relates to a machine for performing these operations of blowing-off and sealing-in and involves combining blowing-off and sealing-in devices in such a manner that they operate inter-independently and at regularly recurring intervals of time and the parts of a sealing-in device are always in position to receive a bulb and stem for sealing as soon as the bulb has been blown off. As the blowing-off devices require less time than those for the sealing-in operation, I combine with one blowing-off device two sealing-in devices arranged to work alternately and as all three of the devices are driven continuously from a source of power, the operator must supply the lamp parts to the machine at the proper intervals, determined by the speed at which the machine is driven. This speed is such that the operator is kept busy continuously and in order that the production of completed bulbs may be as large as possible, I provide means for performing automatically many of the steps which with the machines heretofore used required the time and attention of the operator.

Figure 2:
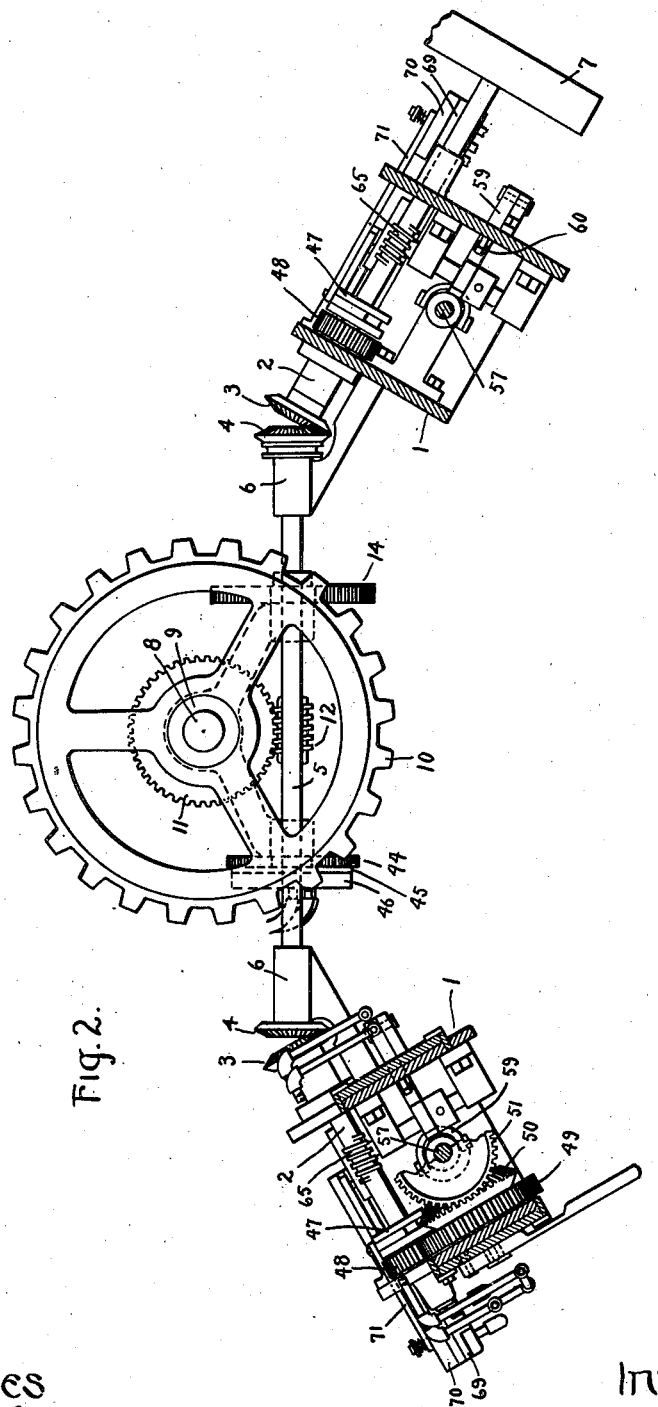

I have illustrated the preferred embodiment of my invention in the accompanying drawings in which Figure 1 is a top view of the machine; Fig. 2 is a similar view with various parts removed; Figs. 3, 4 and 5 are front, side and back views respectively of one of the sealing-in devices; Fig. 6 is a detail of the upper end of the stem-supporting rod; Fig. 7 is a sectional elevation of the blowing-off device; Figs. 8 and 9 are views showing two positions of the main valve; Figs. 10 and 11 are an elevation and a section of the breaker; Fig. 12 is a sectional elevation of the valve controlling the breaker; and Fig. 13 is a diagrammatic view of the valves and the parts controlled thereby.

Referring first to Figs. 1 and 2, A indicates a blowing-off device and B and C two sealing-in devices disposed on opposite sides of the blowing-off device as shown in the drawings, so as to be within convenient reach of the operator who sits directly in front of the blowing-off device. Each of the sealing-in devices is supported upon a frame 1 in the sides of which are bearings for a shaft 2, the shafts 2 carry on their adjacent ends bevel gears 3 meshing with similar gears 4 on the ends of a shaft 5 rotatable in bearings 6 carried by arms secured to the adjacent sides of the frames 1. On the end of one of the shafts 2 is a pulley 7 by means of which and a belt running thereon, rotary motion is communicated to shaft 2 and 5 from any suitable source of power. The blowing-off device (Fig. 7) is carried by a standard 8 on which a sleeve 9 is rotatable. This sleeve carries a large sprocket 10 and a worm-wheel 11 and meshing with the worm-wheel is a worm 12 carried by a shaft 13, mounted for rotation in bearings carried by standard 8. Secured on shaft 13 is a gear 14 meshing with a pinion 15 carried by shaft 5. An endless chain 16 runs on the sprocket 10 and on another sprocket at any suitable point. Secured to this chain are a plurality of receptacles 17 for carrying lamp bulbs to the machine from any suitable position. Secured on the upper end of standard 8 is a frame 18 carrying at its upper end an annular member 19 having two annular chambers 20 and 21 therein, and mounted on top of the member 19 are a plurality of blow-pipe burners 22 radially disposed about the axis of the member. These burners communicate with the annular chamber 21 and the blowers therefor with the annular chamber 20 and gas and air are supplied to these chambers by pipes 23 and 24 respectively. Secured on the member 19 is an arm 25 having a vertical portion at its end, on which a member 26 is vertically adjustable and arranged to be locked in any adjustable position by a hand-nut 27. Formed on this member 26 is a bearing for a rotary bulb-support 28 having an annular opening therethrough, the walls of which may be lined with felt. Rotary motion is communicated to this support by a belt 29 running in a groove therein and also upon sheaves 30 and a pulley 31 carried by shaft 5. Also mounted on member 19 is a cylinder 32 in which a piston 33 (Figs. 10 and 11) is adapted to be reciprocated in a manner hereinafter described, and this piston is connected to a yoke 34 which at its other end is connected to a breaking lever 35 pivoted in an arm secured to the cylinder 32 and extending inward radially of member 19. Mounted above these parts in axial alinement with member 19 is a cylinder 36, and a tube 37 extends through openings in the ends of this cylinder. At its lower end tube 37 carries a cup 38 the mouth of which may be lined with felt or rubber and which is adapted to fit over the tubulature of a bulb held in the support 28 to establish an air connection from a flexible tube 39 connected to the upper end of pipe 37, and through pipe 37 to the bulb. Within the cylinder 36 a piston 40 (Fig. 13) is secured upon the tube 37 and pipes 41 and 42 communicate with the upper and lower ends respectively of cylinder 36. On the shaft 13 is a pinion 43 meshing with a gear 44 formed on the periphery of the movable member 45 of a valve having a stationary member 46. This valve is arranged to control the admission of air to the upper and lower ends of cylinder 36 to operate the piston therein and also to control the supply of gas and air to the burners 22. Its operation will be described in detail hereinafter.

The sealing-in devices will now be described with reference particularly to Figs. 3, 4, 5 and 6.

Splined on the shaft 2 between the sides of frame 1, is a clutch-member 47 having a peripheral groove therein and on one face a pin which, when the clutch-member is moved axially of shaft 2, is arranged to enter one of a plurality of openings in a gear 48 loose on shaft 2 and meshing with a gear 49 carried by a suitable stub shaft. Formed integral with gear 49 is a bevel gear 50 meshing with a bevel gear 51 on a hollow shaft 52 which is rotatable in bearings carried by the frame. Splined on the upper end of hollow shaft 52 is a cross-head 53 and extending upward from the outer ends of the cross-head are rods 54 carrying a support 55 for a lamp bulb. Cross-head 53 and the parts carried thereby are adjustable axially on shaft 52 by means of the rack and pinion 56. Movable axially in the hollow shaft 52 is a shaft 57 provided with a pin entering a longitudinal groove in the interior of the hollow shaft 52 so that shafts 52 and 57 must rotate together. The upper portion of shaft 57 is reduced in cross-section so that a stem carrying a lamp filament may be supported upon its end. The upper end of the rod is slotted (Fig. 6) and a bar 57' mounted on the end of shaft 52 extends through this slot so that when rod 57 is lowered bar 57' coacts with the inclined walls of the slot to spread the two portions of the rod and cause them to hold the stem firmly. Secured on shaft 57 near its lower end is a member 58 having a peripheral groove therein into which extends a pivoted arm 59, normally held in a raised position by a spring 60. On this arm is a roller adapted to coöperate with a raised portion 61, on a cam 62, carried by a shaft 63. This shaft also carries a worm wheel 64 meshing with a worm 65 on shaft 2, and in the side of worm wheel 64 a cam groove 65' is formed, into which extends a projection on a lever 66 mounted to slide back and forth in a groove formed in an arm 67 secured to the side of frame 1. Lever 66 is provided with a vertical portion 68, extending into the peripheral groove in the clutch-member 47. Mounted on the frame 1 is a valve consisting of a stationary member 69 and a member 70 adapted to be reciprocated around the axis of the stationary member 69 and to effect this movement the member 70 is connected by a link 71 with the lever 66. This valve is arranged to control the supply of gas and air to a plurality of blow-pipe burners 72, supported on the top of frame 1 and disposed radially about the axis of shaft 52. If desired these burners may be arranged for vertical adjustment. The gas and air are carried to the valve by pipes 77 and 78 and from it to the burners by pipes 73 and 74 respectively. The operation of the two valves 69 70 for supplying the gas and air to the burners 72 of each sealing-in device will be best understood by reference to Fig. 13 of the drawings at the sides of which the two valves are shown diagrammatically. In this figure the pipes carrying gas are indicated by broken lines and the pipes carrying air under pressure by solid lines. In the stationary member 69 of each valve are four ports 75, 76, 79 and 80. The pipes 73 and 74 connect ports 75 and 76 with the burner and blower respectively of the blow-pipe burners 72. The pipes 77 and 78 connect the ports 79 and 80 with the gas and air mains G and L respectively. In the movable member 70 of each valve are two passageways 81 and 82 which in one position of the movable valve-member are arranged to connect ports 75 and 79 and ports 76 and 80 respectively, as shown at the left of Fig. 13, and in the other position, to close these connections, as shown at the right of Fig. 13. The two sealing-in devices on opposite sides of the blowing-off device are similar in all respects except that the cams 65' and 62 thereof are so positioned that they perform their functions alternately at regular intervals.

Referring now to Figs. 8, 9 and 13, the operation of the main valve 45 46 controlling the parts of the blowing-off device will be described.

In practice I have found it desirable to employ for raising and lowering piston 40 and cap 38 air at a higher pressure than that admitted to the bulb through pipe 37 and cap 38. The main H carrying this high pressure air and the pipes connected thereto are indicated in the drawings by heavy lines. In the stationary member 46 of the main valve are two ports 83 and 84 to which the high pressure air main H is connected by suitable pipes and two ports 85 and 86 connected by the pipes 41 and 42 respectively with the ends of cylinder 36. In the movable member 45 of the valve are two passageways 87 and 88 the former adapted to connect ports 83 and 85 to admit air to the top of cylinder 36 through pipe 41 and the latter to connect ports 84 and 86 to admit air to the bottom of cylinder 36 through pipe 42. In order to permit the exhaust of the air from above the piston 40 when air is admitted to the lower side, a passageway 89 is provided in the movable valve-member which is open to the atmosphere and a port 89' coöperating therewith is connected to port 85. In order to permit the exhaust of the air from the lower side of the piston when air is admitted to the upper side, a passageway 90 is provided in the movable valve-member which is open to the atmosphere and a port 90' in the stationary valve-member coöperating therewith is connected to port 86. For controlling the supply of air and gas to the blow-pipe burners 22 of the blowing-off machine, the stationary valve-member 46 is provided with four ports 91, 92, 93 and 94, port 91 being connected to the gas main G, port 92 to the low pressure air main L, and ports 93 and 94 to the chambers 21 and 20 by pipes 23 and 24 respectively. In the movable valve-member 45 are two passageways 95 and 96, the former adapted to connect ports 91 and 93 and the latter to connect ports 92 and 94. The movable valve-member 45 also controls the operation of the breaker and for this purpose is provided with a projection 97 adapted to actuate the plunger 98 of a valve. This plunger is normally held in the raised position in its cylindrical casing 99 (Fig. 12) by a coiled spring 100 and when depressed by projection 97, a peripheral groove in the plunger connects two pipes 101 and 102 entering the cylinder 99 at diametrically opposite points. Pipe 101 is connected to the high pressure air pipe H and pipe 102 extends up and enters the cylinder 32 in which the piston 33 for operating the breaker lever 35 reciprocates. The construction of the piston is such that the compressed air entering at the pipe 102 reciprocates the piston within its cylinder rapidly in a manner well understood, by acting upon the surface 103 (Fig. 11) to raise the piston until the admission of air to act upon this surface is cut off by the wall 104 and then acting upon the wall 105 to lower the piston again.

The operation of the machine will now be described.

One complete operation of the blowing-off device takes place for each revolution of the movable valve-member 45. One complete operation of each sealing-in device takes place for each revolution of the shaft 63 carrying cams 62 and 65'. The gearing is so arranged that each of the two sealing-in devices operates at one-half the speed of the blowing-off device and as they operate in alternation one or the other is in position to receive a bulb as soon as it is blown-off. When the machine is running, the power being applied to the pulley 7, the bulbs are brought to the operator by the endless carrier 16 and the operator places the bulbs in the rotary holder 28 and after being blown-off places them in one or the other of the holders 55, at the same time mounting a stem on the end of shaft 57, and after sealing-in removes them. The starting position is illustrated in Fig. 13. Piston 40 is held up by air from pipe H through port 84, passage 88, port 86 and pipe 42. The operator takes a bulb from a receptacle 17 and places it in the rotating holder 28, its long neck extending down through the holder and being unsupported. The movable member 45 of the valve is driven by shaft 5 and after rotating through about a quarter of a revolution, passages 95 and 96 connect ports 91 and 93 and ports 92 and 94 as shown in Fig. 8. This admits gas from pipe G to chamber 21 and air from pipe L to chamber 20 and the blow-pipe burners 22 supplied from these chambers play upon the neck of the bulb at the proper point as determined by the adjustment of member 26. The bulb in the holder 28 is rotated continuously by belt 29 so that the bulb neck is uniformly heated along the line of cutting. This relation of the parts continues during almost a half revolution of the movable valve member and during this time the walls of the bulb-neck are softened and fall inward and the portion of the neck below the line of cutting drops off by its own weight leaving on the bulb a short neck which is closed at its end. The passages 95 and 96 then pass beyond ports 91 and 92 so that the supply to chambers 20 and 21 is cut off and immediately thereafter passage 87 connects ports 83 and 85, the end of passage 89 moves away from port 89' and passage 90 comes over port 90', the parts being then in the position illustrated in Fig. 9. This admits air to the upper side of piston 40 from main H through port 83, passage 87, port 85 and pipe 41 and piston 40 is forced down, the air from the under side of the piston being exhausted through pipe 42 to port 86 and then through the connection to port 90' and passage 90 to the atmosphere. Piston 40, pipe 37 and cap 38 are thus moved down until the cap fits over the bulb as shown in Fig. 7 and air is admitted to the bulb from main L through pipes 39 and 37 and cap 38. As the pressure within the bulb is raised the soft glass which closes the end of the bulb-neck is expanded, the walls thereof becoming thinner and thinner, until finally it breaks leaving at the end of the neck a rough edge of very thin and fragile glass. As the rotation of the movable valve-member 45 continues, the projection 97 thereon engages the plunger 98 of the valve controlling the breaker and operates it, against the tension of its spring 100, to admit air from main H through pipe 101, the valve and pipe 102 to the breaker cylinder 32 thereby causing the breaker piston 33 to be rapidly reciprocated. This actuates the breaker lever 35 to deliver a series of light blows to the edge of the bulb neck as the bulb is rotated, thus breaking off projecting portions of glass and making the edge of the neck more smooth. Further rotation of the movable valve-member causes the projection 97 to disengage plunger 98 whereupon the operation of the breaker ceases, the air thereto being cut off by the plunger 98. At about the same time, the end of passage 90 moves away from port 90' closing the exhaust from the under side of piston 40, passage 88 connects ports 84 and 86 and passage 89 comes over port 89'. Air is thus admitted from main H through port 84, passage 88, port 86 and pipe 42 to the under side of piston 40 and exhausted from the upper side through pipe 41 to port 85, through the connection of port 89' and passage 89 to the atmosphere and piston 40 and cap 38 are raised. The bulb thus blown off is removed from support 28 and another one taken from carrier 16 and put in its place. At this time when the operator has removed a blown-off bulb from support 28 one or the other of the sealing-off devices is in the position in which cam 62 releases rod 57, and cam 65' holds clutch-member 47 in the inoperative position, and valve-member 70 in the position in which the blow-pipe flames are cut down as shown at the right of Fig. 13. The operator mounts a stem carrying a filament on the upper end of shaft 57 and then moves the stem until it rests in the holder 55. While another bulb is being blown off cam 65' moves lever 66 on its guide 67 to clutch gear 48 to shaft 2 and actuates valve-member 70. The valve-member being actuated, gas and air are supplied to burners 72, as shown at the left of Fig. 13, and the flames therefrom converge upon the bulb neck, and at the same time, the gear 48 being clutched in, causes rotation of shafts 52 and 57 and the stem and bulb carried thereby. The edge of the bulb neck is evenly heated and the walls fall in upon the flare at the lower end of the stem and become joined thereto. When this has been effected the cam 65 again operates lever 66 to actuate valve member 70 and clutch member 47, thus bringing the sealed-in bulb to rest and cutting down the flames. Immediately thereafter, the raised portion 61 of cam 62 on shaft 63 engages the pivoted lever 59 and actuates it to move shaft 57 axially downward. In doing so bar 57' spreads the two portions of the end of rod 59 so that they clutch the stem firmly thus stretching the glass at the point where the two parts join, making a more perfect weld. Immediately after this, raised portion 61 passes out of engagement with pivoted lever 59 thus raising shaft 57 and allowing the two portions of the end of rod 57 to resume their normal condition thus releasing the stem, and the operator removes the bulb placing it in a box or a receptacle on the carrier 16. When the operation of sealing-in this bulb was only half completed, another cycle of operations of the blowing-off device was completed and the bulb which was blown off was transferred to the other sealing-off device, the parts of which were then in position to receive a bulb and stem and the operation of sealing-in proceeded with as above described. The operation continues in this manner, everything being done automatically except the positioning of the parts on the machine and their removal therefrom when completed. As the operation of sealing-in requires approximately twice as much time as the operation of blowing-off the combining of two sealing-in devices with one blowing-off device so that one person can operate the complete machine effects a considerable saving in the cost of the lamps as the work can be done much more rapidly and no intermediate handling of the bulbs is required. The rapidity with which the work can be done is further increased by the employment of power driven valves which automatically control the heaters for softening the glass and the regulation of the pressure within the bulb and the device for breaking off the rough edge of glass after blowing-off.

What I claim as new and desire to secure by Letters Patent of the United States, is,—

1. In a machine for making incandescent lamps, the combination with a blowing-off device, of a plurality of sealing-in devices, and connections for causing said devices to operate in predetermined sequence.

2. In a machine for making incandescent lamps, the combination with a blowing-off device, of a plurality of sealing-in devices, and means for controlling the operation of said devices to bring a sealing-in device into action at the conclusion of each operation of the blowing-off device.

3. A combined blowing-off and sealing-in apparatus for incandescent lamps comprising a blowing-off machine, a plurality of sealing-in machines in coöperative relation to the blowing-off machine, and mechanism for operating the sealing-in machines at a fractional speed of the output of the blowing-off machine whereby the blowing-off machine and sealing-in machines are maintained in continuous service at maximum efficiency.

4. In a machine for making incandescent lamps, the combination with a blowing-off device, of a plurality of sealing-in devices, and connections for causing said devices to operate in predetermined sequence, the several devices being so juxtaposed as to be all within reach of a single operator.

5. In a machine for making incandescent lamps, a sealing-in device having a bulb support, a rod formed at its end to support a stem, heaters for softening the bulb-neck, and means automatically operated for moving said rod axially relative to said bulb-support to expand said stem and assist in effecting the seal.

6. In a machine for making incandescent lamps, a support for a lamp-stem adapted to extend within the open end of the stem, and means for expanding the walls of the support to cause them to grip the stem and hold it firmly.

7. In a machine for making incandescent lamps, a rod on the end of which a lamp-stem is adapted to be mounted, means for automatically reciprocating the rod axially, and means actuated by the movement of the rod for expanding its walls at the end thereof to cause them to grip the stem.

8. In a machine for making incandescent lamps, a sealing-in machine having a bulb-support, a rod adapted to support a stem upon its end within a bulb held in said bulb-support, a heater, means for rotating the heater relatively to the bulb-support and rod, means automatically operated for moving the rod relatively to the bulb support, and means actuated by the movement of the rod for expanding its walls at the end thereof to cause them to grip the stem.

9. In a machine for making incandescent lamps, a blowing-off device having a support for maintaining a bulb in a vertical position, a heater for distributing the flame along the line of cutting below the support, controlling devices for the heater, means for applying pressure to the bulb, and connections between said means and said controlling devices whereby pressure is applied to the bulb after the severed part has fallen off.

10. In a machine for making incandescent lamps, a blowing-off device having a bulb support, a heater, driving means for rotating the support and heater relatively to each other, a coupling for connecting a bulb in said support to a source of supply of compressed air, and means controlled by said driving means for moving said coupling into coöperative relation to a bulb in said support.

11. In a machine for making incandescent lamps, a blowing-off device having a bulb support, a coupling connected to a source of supply of compressed air, pneumatically operated mechanism for moving said coupling over the tubulature of a bulb in said support to carry compressed air to the bulb and for withdrawing it therefrom, controlling devices for said mechanism, a heater, driving means for rotating the bulb support and heater relatively to each other, and connections between said driving means and said controlling devices.

12. In a machine for making incandescent lamps, a blowing-off device having a bulb-support, a heater, means for rotating the support and heater relatively, a coupling for a bulb, a pipe connected thereto, a piston on said pipe, a cylinder in which said piston is adapted to reciprocate, a valve arranged to control the admission of air to the ends of said cylinder, and means for operating the valve.

13. In a machine for making incandescent lamps, a blowing-off device having a support for maintaining a bulb in a vertical position, a heater for distributing a flame along the line of cutting below the support, controlling devices for said heater, driving means for rotating the support and heater relatively to each other and for actuating said controlling devices, and means controlled by said driving means for applying pressure to the bulb after the severed part has fallen off.

14. In a machine for making incandescent lamps, a blowing-off device having a support for maintaining a bulb in a vertical position, a heater for distributing a flame along the line of cutting below the support, means for controlling the pressure within a bulb in said support, controlling devices for said heater, and actuating mechanism for operating said means and said devices in predetermined relation to each other.

15. In a machine for making incandescent lamps, a blowing-off device having a support for maintaining a bulb in a vertical position, blow-pipe burners for distributing a flame along the line of cutting below the support, a valve having a movable member, connections from the valve to said burners and to sources of supply of gas and compressed air, a power-shaft, and gearing connected thereto for rotating the bulb support and burners relatively and for actuating the movable valve-member.

16. In a machine for making incandescent lamps, a blowing-off device having a bulb-support, a heater for softening the neck of a bulb held in said support along the line of cutting, means for regulating the pressure within the bulb, and means for breaking away the glass at the edge of the bulb-neck after blowing-off.

17. In a machine for making incandescent lamps, a blowing-off device having a support for maintaining a bulb in a vertical position, a heater for distributing a flame along the line of cutting below the support, means for regulating the pressure within a bulb in said support, and a breaking device automatically operated for breaking away the glass at the edge of the bulb-neck after blowing-off.

18. In a machine for making incandescent lamps, a blowing-off device having a bulb-support, a plurality of blow-pipe burners for distributing a flame upon the neck of a bulb held in said support along the line of cutting, means for regulating the pressure within the bulb, and a pneumatically-operated breaking lever for breaking away the glass at the edge of the bulb-neck after blowing-off.

19. In a machine for making incandescent lamps, a blowing-off device having a bulb support, a plurality of blow-pipe burners for distributing a flame upon the neck of a bulb held in said support along the line of cutting, means for regulating the pressure within the bulb, a breaking lever, a piston connected thereto, a cylinder in which said piston is adapted to be reciprocated by compressed air, a valve in the connection to said cylinder, and means for operating said valve.

In witness whereof, I have hereunto set my hand this twenty third day of May, 1906.

ALFRED SWAN.

Witnesses:
J. H. ELKINS,
T. J. GRAVES.